US005634965A

United States Patent [19]

Delcroix

[11] Patent Number: 5,634,965

[45] Date of Patent: Jun. 3, 1997

[54] SUBSTANTIALLY LIQUID AQUEOUS COMPOSITION FOR PRESERVING THE LUSTRE OF SMOOTH SURFACES

[75] Inventor: Yves Delcroix, Tourcoing, France

[73] Assignee: Lotigie S.A., France

[21] Appl. No.: 367,324

[22] PCT Filed: Jul. 21, 1993

[86] PCT No.: PCT/FR93/00746

§ 371 Date: Jan. 23, 1995

§ 102(e) Date: Jan. 23, 1995

[87] PCT Pub. No.: WO94/02583

PCT Pub. Date: Feb. 3, 1994

[30] Foreign Application Priority Data

Jul. 22, 1992 [FR] France .................................. 92 09489

[51] Int. Cl.[6] .............................. C09G 1/02; B08B 3/04; B08B 7/00

[52] U.S. Cl. .................................... 106/2; 106/3; 106/11; 106/287.14

[58] Field of Search .................................. 51/309; 106/3, 106/11, 2, 287.14

[56] References Cited

U.S. PATENT DOCUMENTS

| | | | |
|---|---|---|---|
| 2,812,263 | 11/1957 | Geen et al. | 106/11 |
| 2,856,298 | 10/1958 | Watson | 106/11 |
| 3,393,078 | 7/1968 | Lockhart et al. | 106/11 |
| 3,981,826 | 9/1976 | Munro | 252/526 |
| 4,035,163 | 7/1977 | McLaughlin et al. | 106/11 |
| 4,218,250 | 8/1980 | Kasprzak | 106/3 |
| 4,347,333 | 8/1982 | Lohr et al. | 106/3 |
| 5,094,687 | 3/1992 | Elepano | 106/11 |

FOREIGN PATENT DOCUMENTS

| | | | |
|---|---|---|---|
| 0336651 | 10/1989 | European Pat. Off. . | |
| 278893 | 6/1990 | Germany | 106/3 |
| 1267509 | 3/1972 | United Kingdom . | |
| 2011939 | 7/1979 | United Kingdom . | |

OTHER PUBLICATIONS

Chemical Abstract citation 111:102561, corrisponding to JP 63–212462, Sep. 5, 1988.

Chemical Abstract citation 110:40609, corrisponding to JP 63–197586, Aug. 16, 1988.

Chemical Abstract citation 95:117209, corrisponding to JP 56–57863, May 20, 1981.

Database WPI Section Ch, Derwent Publications Ltd., London Class A97, AN 87–252489 [36] & JP, A, 62 172 099 (Daicel Chem Ind KK) 29 Jul. 1987—See Abstract.

Database WPI Section Ch, Derwent Publications Ltd., London GB; Class A97, AN 87–252488 [36] JP,A, 62 172 098 (Daicel Chem Ind KK) 29 Jul. 1987—See Abstract.

Database WPI Section Ch, Derwent Publications Ltd., London, GB; Class D25, AN 85–220442 [36] JP, A, 60 141 799 (Watanabe M) 26 Jul. 1985—See Abstract.

*Primary Examiner*—Melissa Bonner

*Attorney, Agent, or Firm*—Kerkam, Stowell, Kondracki & Clarke, P.C.; Edward J. Kondracki

[57] ABSTRACT

A substantially liquid, aqueous, rare earth oxide based composition for preserving the luster of the smooth surfaces of objects needing to have such an appearance. The composition is characterized in that the rare earth oxide in the composition consists of particles with an average diameter of less than two micrometers (2 μm), and in that aqueous solvent includes a polysiloxane oil and a degreasing agent for diluting the polysiloxane oil.

18 Claims, No Drawings

SUBSTANTIALLY LIQUID AQUEOUS COMPOSITION FOR PRESERVING THE LUSTRE OF SMOOTH SURFACES

BACKGROUND OF THE INVENTION

1. Field of the Invention

The invention relates to a substantially liquid, aqueous, rare earth oxide based composition for preserving the lustre of the smooth surfaces of objects needing to have such an appearance.

2. Technological Background

The invention applies more specifically, though not exclusively, to the preservation of surfaces of glazings of the so-called semi-reflective type, that is, glazings on which one of the surfaces is rendered partially reflective of luminous rays by being coated with a thin layer of metal compounds, such as metal oxides.

The thickness of the above-mentioned layer is generally between zero point three and one point two micrometers (0.3 and 1.2 μm).

It will be noted that the composition of the invention can also be applied to the surfaces of objects made of natural materials as diverse as polyvinyl chloride, stainless steel, varnish paint, copper, and marble.

Whatever the case may be, semi-reflective type glazings have the characteristic of being sensitive to certain atmospheric agents which considerably alter the lustre of their partially reflective surface.

When thus altered, these glazings lose their transparency at the part of the luminous spectrum at which they are initially transparent, but still tend to become absorbent for a large part of the luminous spectrum, which tends to raise their temperature and goes contrary to the thermal insulation effects sought in the field of these semi-reflective glazings.

The lustre of the partially reflective surface of these glazings must therefore be regularly maintained, that is, cleared of the elements which alter it.

In the field of cleaning glazings, particularly in order to eliminate the potential build-up of silicone, it has long been known (GB-A-1.267.509) to use a composition consisting of a combination of at least one detergent agent and at least one metal oxide powder, such as a cerium oxide powder.

This type of composition is criticized for being especially subject to the phenomenon of syneresis and, moreover, for sensitizing the semi-reflective glazings to the action of the altering atmospheric agents.

Also, in the field of polishing optical surfaces, there are known polishing compositions such as that described in the patent application (GB-A-2.011.939).

Such polishing compositions contain cerium oxide particles whose diameter is between one and fifty microns, which gives them a highly abrasive quality and prevents their use for the preservation of glazings of the above-mentioned type.

The abrasive composition described in the patent application (EP-A-0.336.651) would also be unsuitable for the preservation of glazings of the above-mentioned type because it contains, in particular, abrasive particles whose diameter is between thirty and five hundred microns.

SUMMARY OF THE INVENTION

A first object that the invention seeks to obtain is a composition for the preservation of the lustre of the smooth surfaces of objects needing to have such an appearance, a composition which has no destructive effects on any metal oxide coating which may comprise the surface thus treated.

A second object that the invention seeks to obtain is a composition for the preservation of the lustre of semi-reflective glazings which has a protective effect on this surface, that is, which impedes its alteration by atmospheric agents.

A third object which the invention seeks to obtain is a composition of the above-mentioned type which would be stable over time, that is, which would especially not be subject to syneresis.

Toward this end, the subject of the invention is a composition of the above-mentioned type, particularly characterized in that:

- on one hand, the rare earth oxide in the composition consists of particles with an average diameter of less than two micrometers (2 μm), and,
- on the other hand, the aqueous solvent includes a polysiloxane oil and a degreasing agent for diluting the polysiloxane oil.

DESCRIPTION OF THE PREFERRED EMBODIMENTS

The invention will be better understood with the aid of the description below, given as a non-limiting example.

As indicated, the composition is substantially liquid, aqueous, and constituted of a rare earth oxide base, and it serves to preserve the lustre of the smooth surfaces of objects needing to have such an appearance.

More precisely, the composition is advantageously constituted of a cerium oxide base maintained in suspension in a substantially liquid, water-containing solvent.

In a remarkable way, the rare earth oxide in the composition consists of particles with an average diameter of less than two micrometers (2 μm).

Preferably, the composition contains a surfactant.

Notably, the average diameter of the rare earth oxide particles is between one half of a micrometer (0.5 μm) and one and a half micrometers (1.5 μm).

The choice of these dimensions of particles is particularly important in order to provide the composition with sufficient polishing capability to eliminate elements anchored to the treated surface without any risk of attack of a coating, such as a semi-reflective coating, that could be constituted on this surface.

The rare earth oxide consists of cerium oxide, and in a remarkable way, of a selection of cerium oxide which is at least eighty percent (80%) pure.

The choice of the degree of purity of the cerium oxide is determining for the chemical stability of the preserving composition.

Notably, besides water, the liquid solvent includes:

a polysiloxane oil, and a degreasing agent for diluting the polysiloxane oil.

The function of the polysiloxane oil is on one hand to coat the rare earth oxide particles so as to allow them to be maintained in suspension in water, and on the other hand to engender the constitution of a protective film on each surface treated with the composition.

Advantageously, the polysiloxane oil is a polymethylsiloxane oil.

Equally notably, the polysiloxane oil, at a temperature of twenty-five degrees Celsius (25° C.), has a viscosity of ten to the power of minus four square meters per second ($10^{-4}$ $m^2/s$) and a surface tension of two hundred nine ten-thousandths of a Newton per meter (0.0209 N/m).

Advantageously, the degreasing agent for diluting the polysiloxane oil is an agent constituted of a base of esters, hydrocarbons and surfactants.

Notably, the surfactant is the quaternary ammonium type and includes an agent which sequesters carbonates.

In another embodiment, the degreasing agent is an aliphatic hydrocarbon.

In another embodiment, the degreasing agent is an aromatic hydrocarbon.

The proportions of the various remarkable constituents of the composition, as a percentage of the total weight of the water-containing composition, are:

- ten to seventy percent (10 to 70%) for the rare earth oxide,
- zero point one to fifty percent (0.1 to 50%) for the polysiloxane oil, and
- five to sixty percent (5 to 60%) for the degreasing agent for diluting the polysiloxane oil.

Preferably, the proportions of the various remarkable constituents of the composition, as a percentage of the total weight of the water-containing composition, are:

- twenty percent (20%) for the rare earth oxide,
- six percent (6%) for the polysiloxane oil, and
- ten percent (10%) for the degreasing agent for diluting the polysiloxane oil.

In a preferred embodiment, the composition contains a thickening agent in a proportion which varies between zero point one and twenty-five percent (0.1 and 25%) by weight of the water-containing composition, and preferably in a proportion of zero point four percent (0.4%).

The thickening agent is the non-ionic heteropolysaccharide type, such as xanthan gum.

In an equally preferred embodiment, the composition of the invention contains phosphoric acid or phosphomolybdic acid.

These acids have the properties of an antioxidant agent and it has been ascertained that their presence in the composition has the effect of increasing its polishing capability.

The use of the composition of the invention is extremely simple, as it consists of:

- pouring the composition onto a wadding or a felt pad, applying the impregnated surface of the wadding onto the surface to be treated, rubbing the composition onto this surface and letting it dry, and
- after drying, rubbing the treated surface with a dry wadding so as to remove the polishing agent.

The composition of the invention, therefore, does not require any preparation of the surface to be treated, nor any rinsing of the treated surface.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

I claim:

1. A substantially liquid, aqueous, rare earth oxide based composition for preserving semi-reflective window glazings, said composition consisting essentially of, in an emulsion in water;

a. about 20% of rare earth oxide particles having an average diameter of less than 2 micrometers;

b. about 6% of polysiloxane oil;

c. about 10% of a degreasing agent for diluting said polysiloxane oil, wherein said percentages are by weight based on the weight of said composition.

2. The composition according to claim 1, characterized in that:

the rare earth oxide consists of cerium oxide, which is at least eighty percent (80%) pure, and the average diameter of the rare earth oxide particles is between one half of a micrometer (0.5 μm) and one and a half micrometers (1.5 μm).

3. The composition according to claim 1, wherein the polysiloxane oil, at a temperature of twenty-five degrees Celsius (25° C.), has a viscosity of $10^{-4}$ $m^2/s$ and a surface tension of two hundred nine ten-thousandths of a Newton per meter (0.0209 N/m).

4. The composition according to claim 2, wherein the polysiloxane oil, at a temperature of twenty-five degrees Celsius (25° C.), has a viscosity of $10^{-4}$ $m^2/s$ and a surface tension of two hundred nine ten-thousandths of a Newton per meter (0.0209 N/m).

5. The composition according to claim 1, further consisting of a thickening agent in a proportion which varies between zero point one and twenty-five percent (0.1 and 25%) by weight of the liquid composition.

6. The composition according to claim 2, further consisting of a thickening agent in a proportion which varies between zero point one and twenty-five percent (0.1 and 25%) by weight of the liquid composition.

7. The composition according to claim 3, further consisting of a thickening agent in a proportion which varies between zero point one and twenty-five percent (0.1 and 25%) by weight of the liquid composition.

8. The composition according to claim 4, further consisting of a thickening agent in a proportion which varies between zero point one and twenty-five percent (0.1 and 25%) by weight of the liquid composition.

9. The composition according to claim 1, characterized in that the polysiloxane oil is a polymethylsiloxane oil.

10. The composition according to claim 2, characterized in that the polysiloxane oil is a polymethylsiloxane oil.

11. The composition according to claim 3, characterized in that the polysiloxane oil is a polymethylsiloxane oil.

12. The composition according to claim 4, characterized in that the polysiloxane oil is a polymethylsiloxane oil.

13. The composition according to claim 5, characterized in that the thickening agent is a non-ionic heteropolysaccharide.

14. The composition according to claim 1, characterized in that the thickening agent is a non-ionic heteropolysaccharide.

15. The composition according to claim 7, characterized in that the thickening agent is a non-ionic heteropolysaccharide.

16. The composition according to claim 8, characterized in that the thickening agent is a non-ionic heteropolysaccharide.

17. The composition according to claim 1, further consisting of phosphoric acid.

18. The composition according to claim 1, further consisting of phosphomolybdic acid.

* * * * *

UNITED STATES PATENT AND TRADEMARK OFFICE

CERTIFICATE OF CORRECTION

PATENT NO. : 5,634,965
DATED : June 3, 1997
INVENTOR(S) : Yves DELCROIX

It is certified that error appears in the above-indentified patent and that said Letters Patent is hereby corrected as shown below:

Col. 4, line 53 (Claim 14, line 1) "Claim 1" should read --Claim 6--.

Signed and Sealed this

Fourteenth Day of October, 1997

Attest:

BRUCE LEHMAN

*Attesting Officer*

*Commissioner of Patents and Trademarks*